United States Patent
Lee et al.

(10) Patent No.: US 10,162,492 B2
(45) Date of Patent: Dec. 25, 2018

(54) TAP-TO-OPEN LINK SELECTION AREAS

(75) Inventors: Chin-Nan Lee, New Taipei (TW);
Yun-Huan Lee, New Taipei (TW);
Hsiang-Fu Liu, Taipei (TW);
Ta-Chung Tsai, Taichung (TW);
Shu-Fong Huang, Taipei (TW)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 414 days.

(21) Appl. No.: 13/609,676

(22) Filed: Sep. 11, 2012

(65) Prior Publication Data
US 2014/0075277 A1   Mar. 13, 2014

(51) Int. Cl.
*G06F 3/0484* (2013.01)
*G06F 17/30* (2006.01)

(52) U.S. Cl.
CPC .... *G06F 3/04842* (2013.01); *G06F 17/30882* (2013.01)

(58) Field of Classification Search
CPC ............ G06F 17/2235; G06F 17/2247; G06F 17/30882
USPC .......... 715/205, 739, 823, 835, 860
See application file for complete search history.

(56) References Cited

U.S. PATENT DOCUMENTS

| | | | | |
|---|---|---|---|---|
| 8,316,450 B2* | 11/2012 | Robinson | ............. | G06Q 30/02 726/26 |
| 2004/0204128 A1* | 10/2004 | Zakharia | ............. | G06F 3/04812 455/566 |
| 2006/0107205 A1* | 5/2006 | Makela | ............. | G06F 17/30905 715/246 |
| 2006/0293937 A1 | 12/2006 | Sohm et al. | | |
| 2008/0120539 A1 | 5/2008 | Stephens, Jr. | | |
| 2008/0294974 A1* | 11/2008 | Nurmi | ............... | G06F 17/30905 715/204 |
| 2009/0064047 A1* | 3/2009 | Shim et al. | .................. | 715/835 |
| 2009/0128505 A1 | 5/2009 | Partridge et al. | | |
| 2009/0228842 A1* | 9/2009 | Westerman et al. | ......... | 715/863 |
| 2009/0235187 A1 | 9/2009 | Kim et al. | | |
| 2009/0303187 A1 | 12/2009 | Pallakoff | | |
| 2010/0115398 A1* | 5/2010 | Yi | ......................... | G06F 3/0488 715/234 |
| 2011/0099089 A1 | 4/2011 | Wolfram | | |
| 2012/0010995 A1* | 1/2012 | Skirpa | .................... | G06F 3/0481 705/14.49 |
| 2013/0191711 A1* | 7/2013 | Tashman | ............... | G06F 17/241 715/205 |

(Continued)

OTHER PUBLICATIONS

Stanford, Julie, "Ten Things to Think About When Designing Your iPad App", Retrieved on: Jun. 14, 2012, Available at: http://uxdesign.smashingmagazine.com/2012/01/31/ten-things-think-about-designing-ipad-app/.

(Continued)

*Primary Examiner* — Scott T Baderman
*Assistant Examiner* — Hassan Mrabi
(74) *Attorney, Agent, or Firm* — Merchant & Gould

(57) ABSTRACT

A link selection area may be provided. When rendering a document comprising a plurality of selectable elements, a selection area may be defined around each of the plurality of selectable elements, such as links. Upon receiving a selection of one of these selection areas, an action associated with the respective selectable element associated with the at least one selection area may be performed.

20 Claims, 7 Drawing Sheets

(56) References Cited

U.S. PATENT DOCUMENTS

2013/0227488 A1* 8/2013 Tomar ................... G06F 3/0482
715/835
2013/0290906 A1* 10/2013 Thorsander .................. 715/835
2014/0195802 A1* 7/2014 Harris ....................... H04L 9/00
713/165

OTHER PUBLICATIONS

"Mobile/UI/Designs/TouchScreen/Proposal6", Retrieved on: Jun. 14, 2012, Available at: https://wiki.mozilla.org/Mobile/UI/Designs/TouchScreen/Proposal6.

* cited by examiner

TAP-TO-OPEN LINK SELECTION AREAS

BACKGROUND

Users are increasingly browsing and accessing content on mobile devices that often possess a limited amount of screen space. When the content includes links to other content, such as interconnected web pages, the selection of those links by tapping on the screen can be difficult and inaccurate. For example, a typical hyperlink often consist of text characters. To select such a link, the user must tap the text characters exactly. Conventional systems sometimes bypass this problem by replacing links on documents designed for display on mobile devices with large icons instead, but this can interfere with the structure and flow of carefully designed documents. Furthermore, replacing text links with icons can also impact design styles and customizations. For example, text colors/styles cannot apply to icons.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A link selection area may be provided. When rendering a document comprising a plurality of selectable elements, a selection area may be defined around each of the plurality of selectable elements, such as links. Upon receiving a selection of one of these selection areas, an action associated with the respective selectable element associated with the at least one selection area may be performed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
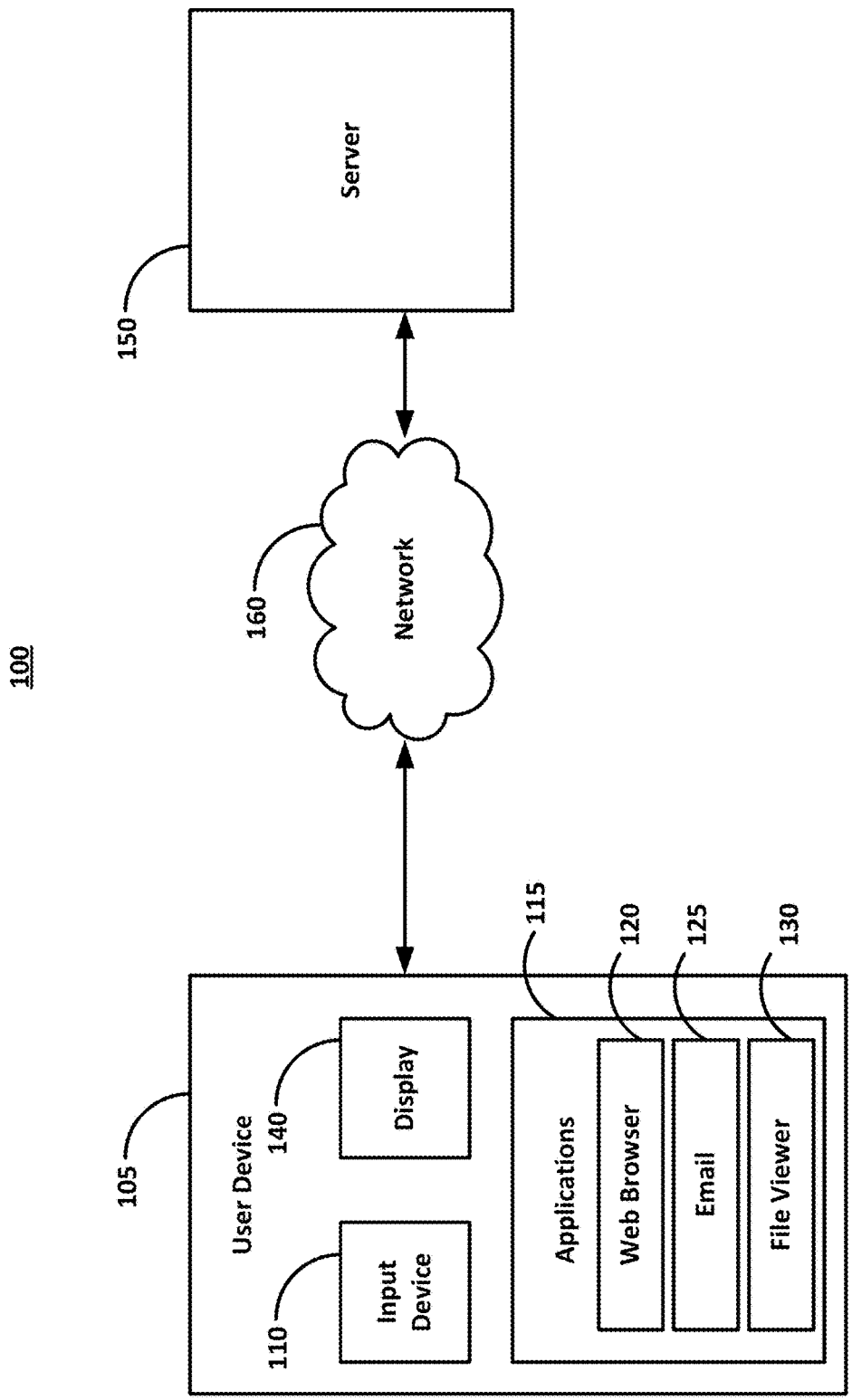
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

When users open documents on their mobile devices, they often navigate through multiple hyperlinks. These hyperlinks may be in the form of text and/or images, such as document names adjacent to icons that indicate the type of the document. Consistent with embodiments of this disclosure, in such cases, users may select the link by tapping on the icon, the text itself, and/or in blank space around the link. The selection of the link may comprise instructing an application displaying the link to execute an appropriate action.

Selection of each element of the link, (e.g., the icon, the text, or the surrounding space) may cause the execution of the same and/or different actions. For example, selecting the icon and/or space around it may result in the application displaying properties for the linked document while selecting the text may result in opening the document.

The application may recognize different gestures as 'tapping' of the linked document. For example, the use of two fingers to select the link may result in one action, while using one finger to select the link results in a different action. Similarly, tapping the link while making a movement with the finger may trigger yet another action.

Each link displayed in a document may have a selection area defined around it as part of rendering the document for display. The size and shape of the selection area may be selected according to the display size of the link (e.g., number of text characters and/or size of an image), by the type of link, and/or by the action to be performed. For example, an image may have a circular or elliptical selection area defined around the visible image, while a lengthy string of text may have a rectangle. Each selection area may be defined, for example, by a size measurement such as pixels.

The size of the selection area for a given link may also be varied based on an estimated likelihood that the link will be selected. For example, a user interface designer creating a form to select from a list of documents may determine that a link to a recently edited document is more likely to be selected than a link to a document edited much longer ago. Although the text that forms the basis of the link to each document may be approximately the same size, the selection area around the more recently edited document may comprise a larger area around that text than the selection area around the less recently edited document.

Once the link has been tapped by the user, the user interface may display an indication that the tap has been detected. For example, a selected text link may be highlighted and/or a border may be displayed around the link. The indication may be varied based on the type of gesture, such as highlighting the link for a "tap and hold" gesture and drawing a box around the link for a "tap and release" gesture. Some mobile devices may be operable to provide other indicators such as audible sounds and/or haptic/tactile feedback.

FIG. 1 is a block diagram of an operating environment 100 that may provide link selection areas. Operating environment 100 may comprise a user device 105 comprising an input device 110, such as a physical and/or soft keyboard, a touchscreen, a trackpad, a mouse, a camera, and/or a microphone. User device 105 may be operative to execute a plurality of applications 115, such as a web browser 120, an email application 125, and/or a file viewer 130. User device 105 may further comprise a display 140 operative to display information and receive user inputs associated with plurality of applications 115. For example, user device 105 may render documents for view by a user on display 140. User device 105 may be operative to communicate with other computing devices, such as transmitting content requests to a server 150 via a network 160 and receiving results from server 150 for output to display 140.

Figure 2A:
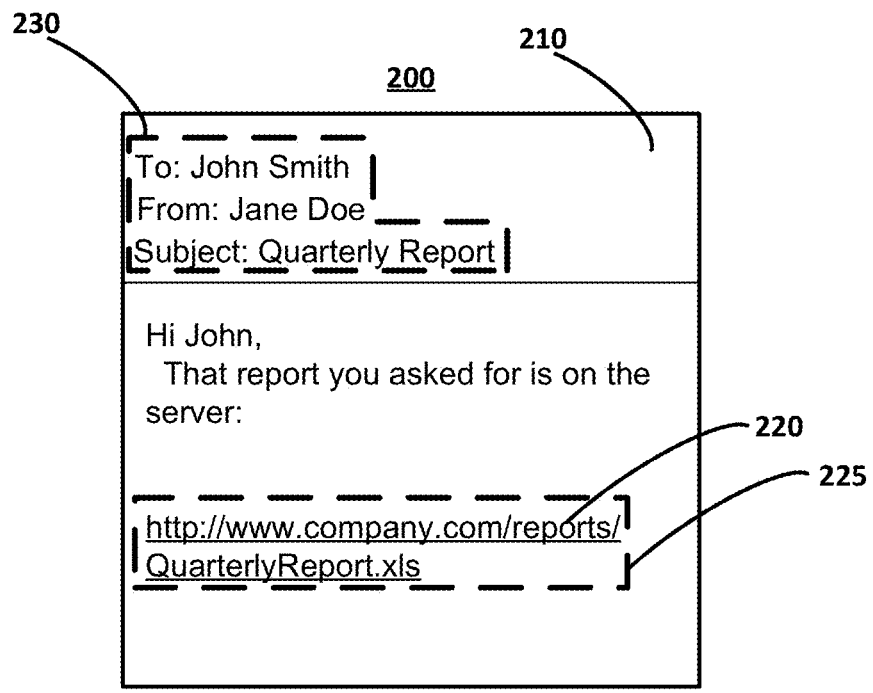
FIGS. 2A-2B are illustrations of a link selection area.

FIG. 2A is an illustration of a user interface 200 as may be displayed on display 140 of user device 105. User interface 200 may display a rendered document 210 comprising a link 220. Link 220 may comprise a selectable element such as a hyperlink to another document and/or a link to a command or menu associated with an application. Upon rendering of link 220, a selection area 225 may be created around link 220 that may be operative to receive selections from the user, such as may be performed via input device 110. For example, rendered document 210 may comprise an e-mail comprising link 220 to a file stored on server 150. Selection area 225 may comprise a rectangular area defined by a distance, such as 25 pixels, from the text comprising link 220. A second selection area 230 may comprise an irregular shape surrounding a second selectable element 235, such as an e-mail header. Selection of second selection area 230 by the user may result in an action being performed such as displaying a menu.

Figure 2B:
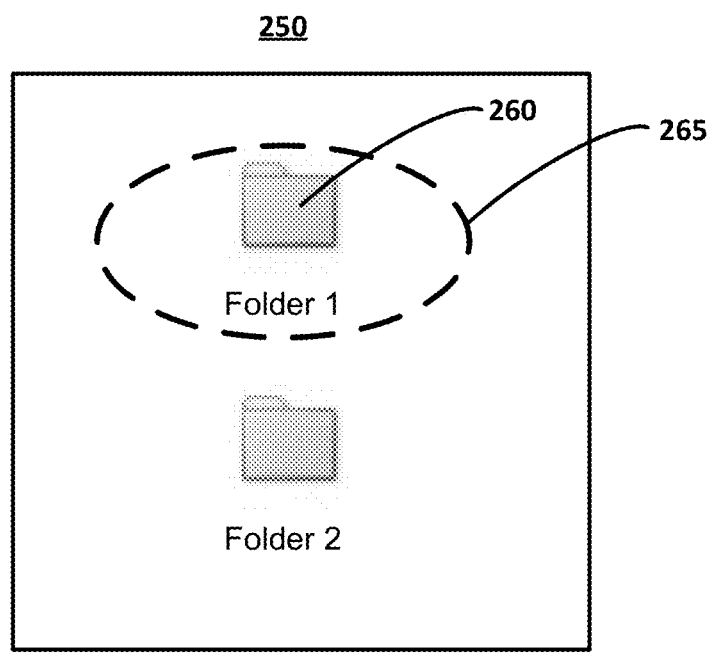

FIG. 2B is an illustration of a second user interface 250 as may be displayed on display 140 of user device 105. Second user interface 250 may comprise a third selectable element 260 comprising a graphic. A third selection area 265 comprising an ellipse may be created around third selectable element 260. An ellipse may be defined as a contiguous arc having a constant sum of the distance from two interior points. That is, although the distance to any given position on the ellipse from either of the two interior points may vary, the distance from the other point will be such that the sum of the distances remains constant.

Figure 3:
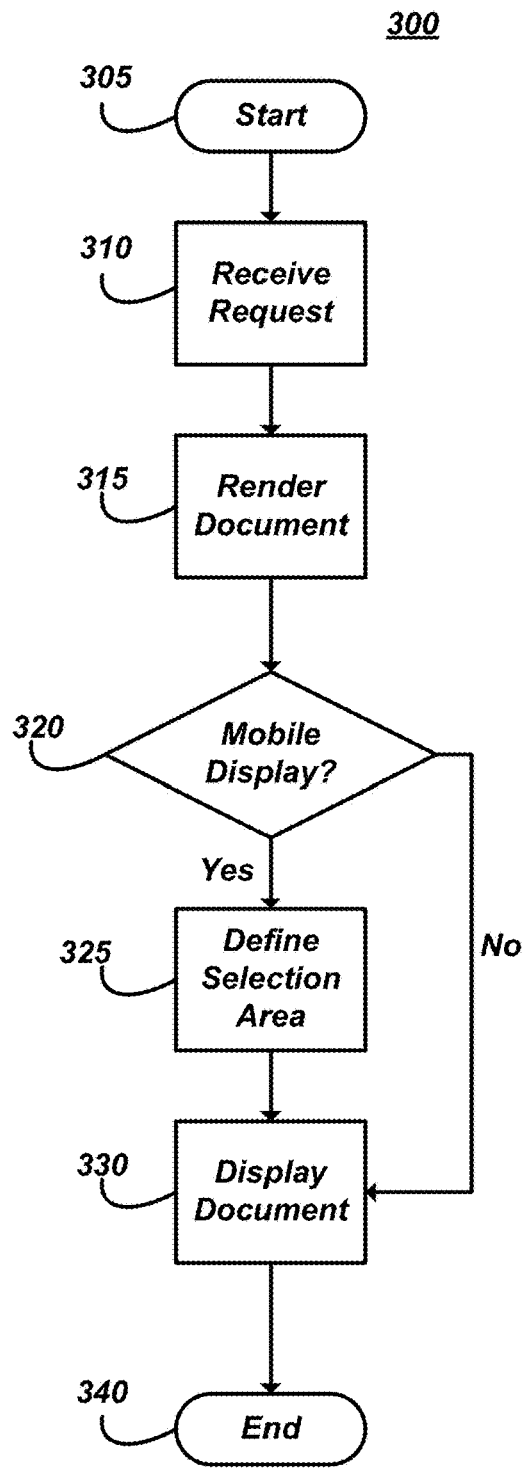
FIG. 3 is a flow chart of a method for providing a link selection area.

FIG. 3 is a flow chart setting forth the general stages involved in a method 300 consistent with an embodiment of the disclosure for providing link selection areas. Method 300 may be implemented using a computing device 400 as described in more detail below with respect to FIG. 4. Ways to implement the stages of method 300 will be described in greater detail below. Method 300 begins at starting block 305 and proceeds to stage 310 where computing device 400 may receive a request for a document. For example, a user may activate one of plurality of applications 115 to load a file. Requested documents may comprise many types of electronic data, such as a text document, a web page, a presentation, an e-mail, a user interface, and/or a spreadsheet.

Method 300 may then advance to stage 315 where computing device 400 may render the requested document for display. The document may comprise selectable elements such as text and/or image based links, menu elements, and/or draggable objects. For example, user device 105 may render first user interface 200 and/or second user interface 250 on display 140.

Method 300 may then advance to stage 320 where computing device 400 may determine whether the document is being displayed on a mobile device. For example, an e-mail rendered on a desktop computer may not be considered to be on a mobile device while a web page rendered in web browser 120 on a cellular phone may be considered mobile.

In response to determining that the document is being displayed on a mobile device, method 300 may advance to stage 325 where computing device 400 may define a selection area within the rendered document around the selectable element(s). The selection area may comprises a contiguous area encompassing the selectable element, such as a square, rectangle, circle, ellipse, and/or any other regular and/or irregular shape. For example, a text-based link to another document may have a rectangle defined around the text based on a pre-defined distance in pixels from the top, bottom, and side edges of the text. An elliptical selection area may be defined by two points along a horizontal or vertical axis of the selectable element.

After defining the selection area at stage 325, or if the document is determined not to be displayed on a mobile device at stage 320, method 300 may advance to stage 330 where computing device 400 may display the rendered document. For example, user device 105 may output the rendered document to display 140. User device 105 may then be operable to receive selections of the selectable element(s), either by receiving a selection of the element itself or anywhere within the defined area. The selection may comprise a gesture by a user to the displayed document, such as a tap-and-hold, a tap-and-release, a swipe motion, and/or a single or multi-finger tap. User device 105 may perform actions according to the selection. Method 300 may then end at stage 340.

An embodiment consistent with the invention may comprise a system for providing automatic application redirection. The system may comprise a memory storage and a processing unit coupled to the memory storage. The processing unit may be operative to render a document comprising a plurality of selectable elements, define a selection area around each of the plurality of selectable elements, receive a selection of at least one selection area, and perform an action associated with the respective selectable element associated with the at least one selection area.

Another embodiment consistent with the invention may comprise a system for providing automatic application redirection. The system may comprise a memory storage and a processing unit coupled to the memory storage. The processing unit may be operative to receive a request for a document, render the document for display, wherein the document comprises at least one selectable element, define a selection area within the rendered document around the at least one selectable element, receive a selection of the at least one selectable element, wherein the selection comprises a gesture by a user to the displayed document, and perform an action associated with the at least one selectable element according to the received selection.

Yet another embodiment consistent with the invention may comprise a system for providing automatic application redirection. The system may comprise a memory storage and a processing unit coupled to the memory storage. The processing unit may be operative to receive a request for a document, render the document comprising a selectable element for display, and determining whether the document is being displayed on a mobile device. In response to determining that the document is being displayed on the mobile device, the processing unit may be operative to define a selection area within the rendered document around the at least one selectable element, wherein the selection area comprises a contiguous area encompassing the at least one selectable element, receive a selection of the at least one selectable element, wherein receiving the selection comprises identifying a gesture by a user to the displayed document, and perform one of a plurality of possible actions associated with the at least one selectable element according to the received selection.

Figure 4:
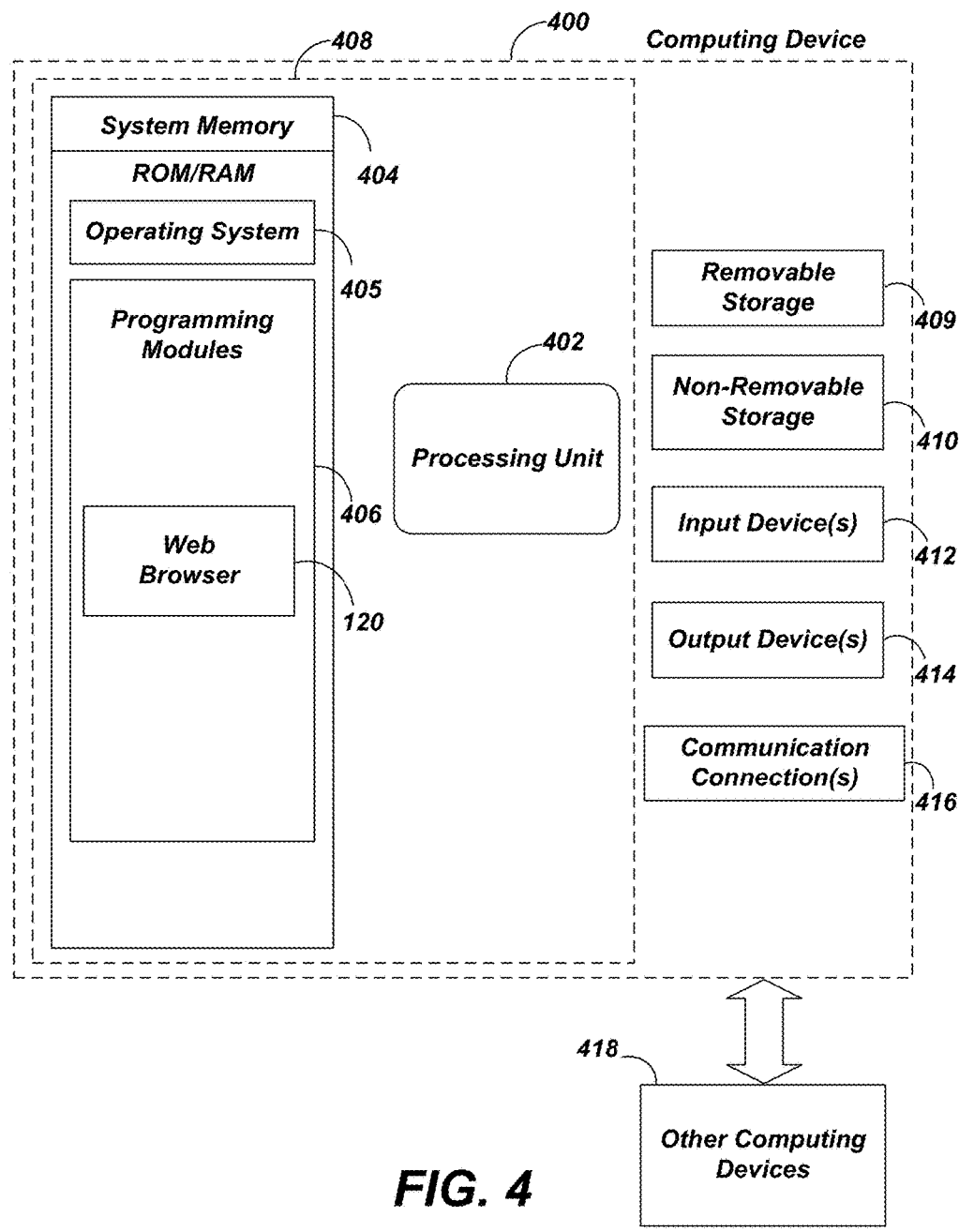
FIG. 4 is a block diagram of a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise user device 105 and/or server 150 as described above. Methods described in this specification may operate in other environments and are not limited to computing device 400.

With reference to FIG. 4, a system consistent with an embodiment of the disclosure may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may comprise, for example, web browser 120. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., web browser 120) may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 5A:
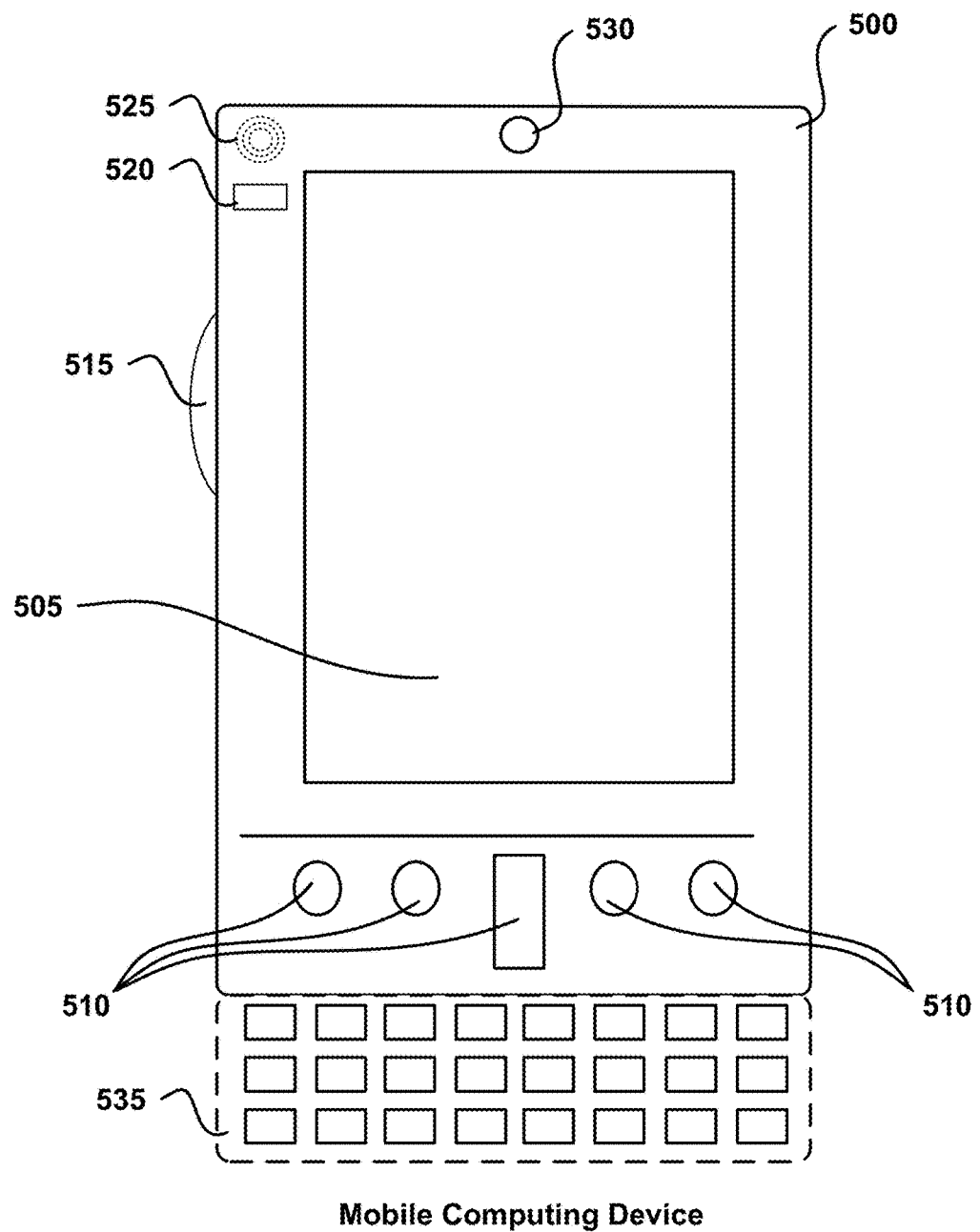
FIGS. 5A-5B are simplified block diagrams of a mobile computing device with which embodiments of the present disclosure may be practiced.
Figure 5B:
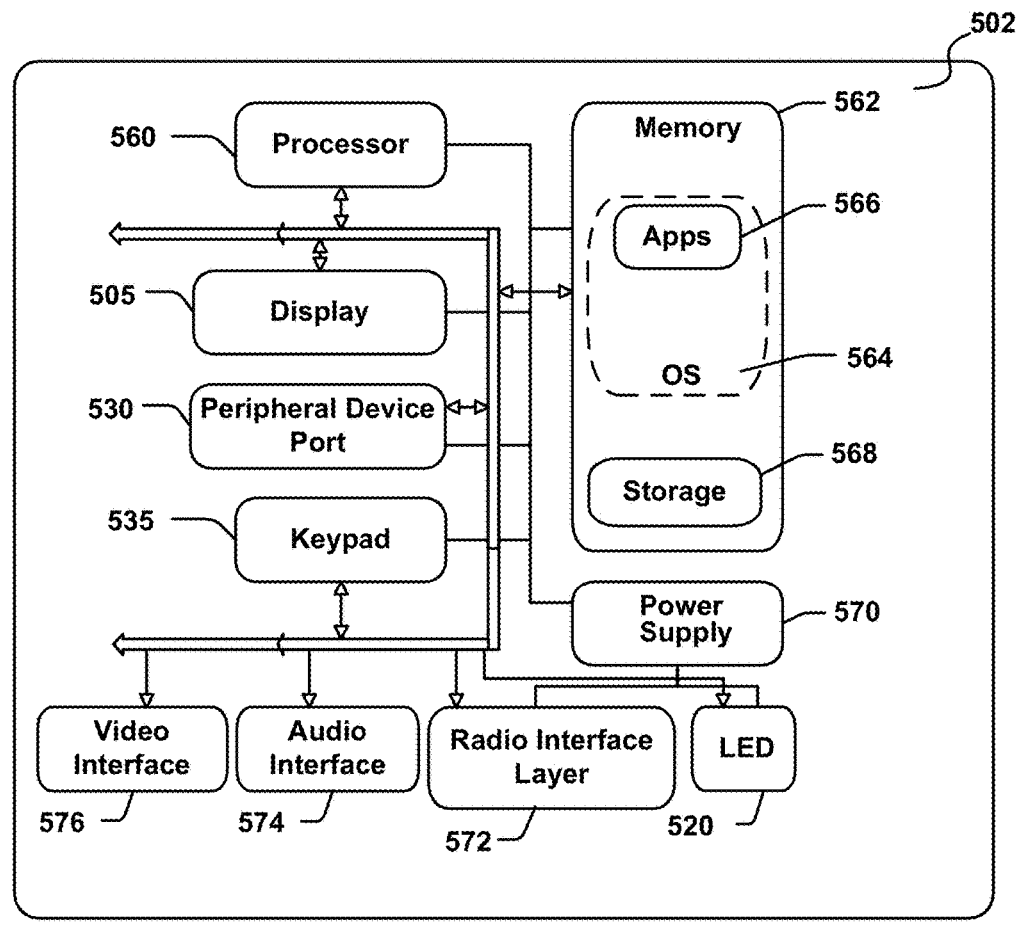

FIGS. 5A and 5B illustrate a mobile computing device 500, for example, a mobile telephone, a smart phone, a tablet personal computer, a laptop computer, and the like, with which embodiments of the disclosure may be practiced. With reference to FIG. 5A, an exemplary mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries. The system 502 may also include a radio 572 that performs the function of transmitting and receiving radio frequency communications. The radio 572 facilitates wireless connectivity between the system 502 and the "outside world", via a communications carrier or service provider. Transmissions to and from the radio 572 are conducted under control of the operating system 564. In other words, communications received by the radio 572 may be disseminated to the application programs 566 via the operating system 564, and vice versa.

The radio 572 allows the system 502 to communicate with other computing devices, such as over a network. The radio 572 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 502 provides notifications using the visual indicator 520 that can be used to provide visual notifications and/or an audio interface 574 producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568. Computer storage media may include volatile and nonvolatile, removable and non-removable media implemented in any method or technology for storage of information, such as computer readable instructions, data structures, program modules, or other data.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

Figure 6:
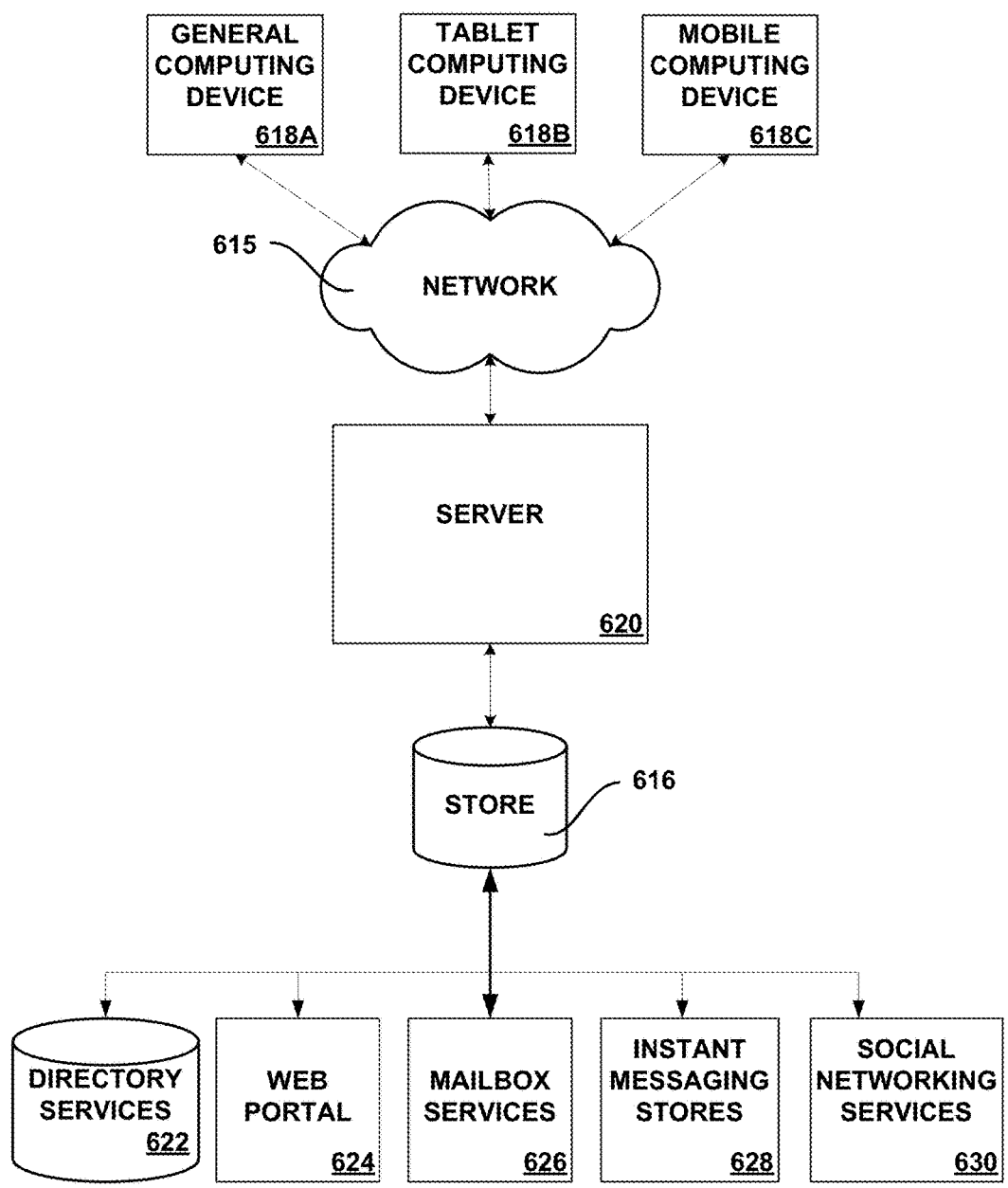
FIG. 6 is a simplified block diagram of a distributed computing system in which embodiments of the present disclosure may be practiced.

FIG. 6 illustrates one embodiment of the architecture of a system for providing applications to one or more client devices, as described above. Content developed, interacted with or edited in association with such applications may be stored in different communication channels or other storage types. For example, various documents may be stored using a directory service 622, a web portal 624, a mailbox service 626, an instant messaging store 628, or a social networking site 630. An email client application, for example, may use any of these types of systems or the like for enabling co-authoring conflict resolution via comments, as described herein. A server 620 may provide applications to the clients. As one example, the server 620 may be a web server providing an email client application over the web. The server 620 may provide the email client application over the web to clients through a network 615. By way of example, the client computing device 618 may be implemented as computing device 400 and embodied in a personal computer 618a, a tablet computing device 618b and/or a mobile computing device 618c (e.g., a smart phone). Any of these embodiments of the client computing device 618 may obtain content from the store 616. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, may operate via application-specific logic integrated with other components of the computing device/system 400 on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Assignee. The Assignee retains and reserves all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing a link selection area, the method comprising:
   rendering a document comprising a plurality of links;
   defining selection areas around each link of the plurality of links,
   wherein a given selection area is associated with a respective link of the plurality of links,
   wherein the given selection area defines an area in the document that includes the respective link and blank space around the respective link that has a respective size and a respective shape,
   wherein the respective size and the respective shape of the given selection area can be defined based on a display size of the respective link and on an action to be performed, and
   wherein the respective size of the given selection area can be defined by an estimated likelihood of the respective link being selected;
   receiving a selection of the given selection area; and
   performing an action associated with the respective link associated with the given selection area.

2. The method of claim 1, wherein the document comprises a web page.

3. The method of claim 1, wherein the document comprises an application user interface.

4. The method of claim 1, wherein the document comprises an e-mail.

5. The method of claim 1, wherein receiving the selection of the given selection area comprises identifying a gesture by a user.

6. The method of claim 5, wherein performing the action associated with the respective link comprises performing one of a plurality of possible actions according to the identified gesture.

7. The method of claim 5, further comprising identifying the gesture according to a duration of the gesture.

8. The method of claim 5, further comprising identifying the gesture according to how the respective link is tapped.

9. The method of claim 5, wherein receiving a selection of the given selection area includes receiving a selection of the blank area around the respective link of the plurality of links.

10. The method of claim 1, wherein the link is one of text or an image.

11. The method of claim 1, wherein performing the action associated with the respective link comprises performing the action based on the respective shape of the given selection area that was selected.

12. The method of claim 1, wherein performing the action associated with the respective link comprises performing the action based on a type of gesture received within the given selection.

13. The method of claim 1, wherein a second selection area associated with a second link of the plurality of links defines a second area in the document that includes the second link and blank space around the second link that has a second size that is defined by a second estimated likelihood of the second link being selected, wherein the respective size is larger than the second selection area when the estimated likelihood and the second estimated likelihood indicate that the respective link is more likely to be selected than the second link, and wherein the second selection area is larger than the respective size when the second estimated likelihood and the estimated likelihood indicate that the second link is more likely to be selected than the respective link.

14. A system for providing a link selection area, the system comprising:
    a memory storage; and
    a processing unit coupled to the memory storage, wherein the processing unit is operable to:
    receive a request for a document;
    render the document for display, wherein the document comprises at least one link;
    define selection areas within the rendered document around each link of the at least one link,
    wherein a given selection area is associated with a respective link of the at least one link; wherein the given selection area defines an area in the document that includes the respective link and a blank space around the respective link that has a respective size and a respective shape;
    wherein the respective size and the respective shape of the given selection area can be defined based on a display size of the respective link and on an action to be performed, and
    wherein the respective size of the given selection area can be defined based on an estimated likelihood that the respective link will be selected from among the at least one link;
    receive a selection of the given selection area wherein the selection comprises a gesture by a user to the rendered document; and
    perform an action associated with the respective link according to the received selection.

15. The system of claim 14, wherein the respective shape comprises a regular geometric shape.

16. The system of claim 15, wherein the respective link comprises at least one text character and the regular geometric shape comprises a rectangle.

17. The system of claim 15, wherein the regular geometric shape comprises a circle defined by a radius from a center of the respective link.

18. The system of claim 15, wherein the regular geometric shape comprises an ellipse defined by a constant comprising a sum of a distance from two points within the respective link.

19. The system of claim 14, wherein to perform the action associated with the respective link the processing unit is further operable to perform the action based on the respective shape of the given selection area that was selected.

20. A computer-readable storage medium which stores a set of instructions which when executed performs a method for providing a link selection area, the method executed by the set of instructions comprising:
    receiving a request for a document, wherein the document comprises at least one of the following: a text document, a web page, a presentation, an e-mail, a spreadsheet, and a user interface;
    rendering the document for display, wherein the document comprises a plurality of hyperlinks;
    determining whether the document is being displayed on a mobile device;
    in response to determining that the document is being displayed on the mobile device:
    defining a plurality of selection areas within the rendered document;
    wherein each selection area is associated with one respective hyperlink of the plurality of hyperlinks;

wherein the selection area comprises a contiguous area encompassing the respective hyperlink and blank space in the document;

wherein the contiguous area is of a size and a shape that can be defined based on a display size of the respective hyperlink and on an action to be performed; and wherein the contiguous area is of a size that can be defined by an estimated likelihood that the respective hyperlink will be selected from among the plurality of hyperlinks;

receiving a selection of the respective hyperlink, wherein receiving the selection comprises identifying a gesture made by a user to the displayed document within a selection area of the plurality of selection areas associated with the respective hyperlink; and performing an action associated with the respective hyperlink according to the received selection, wherein performing the action associated with the respective hyperlink comprises performing one of a plurality of possible actions according to the identified gesture.

* * * * *